United States Patent [19]

Johnson

[11] Patent Number: 4,900,387

[45] Date of Patent: Feb. 13, 1990

[54] METHOD OF BONDING VIA ELECTRORHEOLOGICAL ADHESIVES

[75] Inventor: Joseph C. Johnson, Bellevue, Wash.

[73] Assignee: The Boeing Company, Seattle, Wash.

[21] Appl. No.: 159,755

[22] Filed: Feb. 24, 1988

[51] Int. Cl.$^4$ .............................................. B32B 31/28
[52] U.S. Cl. ................................ 156/272.2; 427/45.1; 427/47
[58] Field of Search ............... 156/272.2, 272.4, 273.5; 252/74, 75, 78.3, 573; 427/45.1, 47

[56] References Cited

U.S. PATENT DOCUMENTS 2,661,596 12/1953 Winslow .
3,047,507 7/1962 Winslow .
3,599,428 8/1971 Chaney et al. .
4,595,445 6/1986 Hombach et al. .
4,772,407 9/1988 Carlson ................................. 252/74

OTHER PUBLICATIONS

Sprecher, A. F., et al., Electrorheology at Small Strains and Strain Rates of Suspensions of Silica Particles in Silicone Oil, Materials Science and Engineering 95:187–197, 1987.

*Primary Examiner*—Merrell C. Cashion, Jr.
*Attorney, Agent, or Firm*—Christensen, O'Connor, Johnson & Kindness

[57] ABSTRACT

Adhesives and coating are formulated with electrorheological materials to thicken when subjected to an electric field. The adhesives are thin and easy to apply, but thicken to prevent running while the adhesive cures or sets. A uniform bond along the joint is formed, thereby eliminating the uneven or discontinuous adhesive bonds made with conventional adhesives that reduce the strength and integrity of the joint.

23 Claims, No Drawings

METHOD OF BONDING VIA ELECTRORHEOLOGICAL ADHESIVES

BACKGROUND OF THE INVENTION

The present invention relates to adhesives and coatings and their methods of use.

When conventional, liquid, nonviscous adhesives or coatings are applied to slanted or vertical surfaces, the adhesive or coating runs. Common industrial examples of applications wherein adhesives are applied to slanted or vertical surfaces include assembly of composite structural panels, honeycomb sandwich panels, wiring brackets or the like. In many instances, the application of conventional adhesives or coatings to nonhorizontal surfaces results in potential adhesive gaps near the upper portions of the surface as well as nonuniform thickness of the coating along the surface. Conventional adhesives and coatings have been formulated that are relatively viscous fluids and are slow to run at ambient temperature; however, they become less viscous and run when heated to the necessary curing temperature. Viscous adhesives are also difficult to apply in many circumstances.

A particular illustration of the inadequacy of conventional adhesives is apparent in the airline industry where structural honeycomb cores are sandwich bonded between skins of fiber reinforced composites to form, for example, structural panels. Generally, liquid adhesive is applied to the skins as a thick coating and the skins are then placed on the faces of the honeycomb core. If the initial viscosity of the adhesive is low at ambient temperature or when heated to promote curing, the adhesive runs away from the skin-to-core joints into the cells. Adhesive gaps often result and the bond is poor.

U.S. Pat. No. 4,595,445 to Hombach et al. addresses the problem of honeycomb assembly and suggests a thermosetting polyurethane urea reactive adhesive that is stable at ambient temperature but rapidly sets at higher temperatures. An important feature of the Hombach compositions is their capacity for storage at ambient temperature and their rapid thickening at the curing temperatures, which prevents the adhesive from running. Some materials, however, cannot be exposed to the elevated temperatures that are required to thicken and cure the adhesive composition described by Hombach et al., thereby limiting its usefulness.

The present invention provides a solution to the running problem that is independent of temperature and is applicable for use with most conventional adhesives.

SUMMARY OF THE INVENTION

The present invention is a novel adhesive or coating composition of the adhesive and an effective amount of an electrorheological material. The electrorheological material increases and maintains the viscosity of the adhesive in a nonflowable, gel-state when an electric field is applied, and keeps it from running. The present invention also includes a method using the novel compositions for bonding and coating surfaces on which conventional adhesives would run after application or upon heating. As a consequence, use of the compositions of the present invention decrease or eliminate the problems of conventional discontinuous and irregular adhesives.

DETAILED DESCRIPTION OF THE INVENTION

The term "fibrated" as used herein means of or having a fibrous structure. The term "polar" means having positive and negative bound charges in a body capable of relative displacement by an electric field. The term "fluid" as used in the foregoing discussion and in the following specification and claims, means a material that deforms (i.e., runs) under its own weight to assume the shape of its container.

Electrorheological adhesives of the present invention are generally curable by moderately heating them. Without electrorheological (ER) additives, the adhesives would either have low viscosities at ambient temperature or the curing temperature allowing them to run when applied to a slanted or vertical surface. In the present invention, the resistance to shear (i.e., viscosity) of the electrorheological adhesives can be increased significantly by application of an electrical field. While the adhesive component of the electrorheological adhesive compositions are relatively nonviscous in their uncured state, it should be understood that during curing they become thixotropic, i.e., set up in a gel-like structure. Also, some adhesives are relatively viscous in their uncured state; however, upon being heated, they are subject to breakdown by shear, and running. Though not fully understood, it is believed that the electrorheological additives function to transmit force to the adhesive, thereby increasing the viscosity of the adhesive composition under the influence of an electrical field because each of the individual particles comprise a solid center of nonconductive substance onto which polarizable water and other conductive substances have been adsorbed. In the electrorheological adhesive composition, there exists around each solid particle an insulating sheath provided by the low dielectric adhesive and optional surface active agent (i.e., surfactant). The theory postulated is that charges are free to move about on the surface of the particle as a result of the conductive substance, each particle thereby developing thereon a separation of charge and becoming polar in nature. The particles align themselves to form a fibrated structure with conductivity between the particles being prevented by the insulative effect of the optional surfactant and the low dielectric constant of the adhesive.

As would be expected, the viscosity of the mixture of the adhesive component and the electrorheological material in accordance with the present invention in the absence of the electric field, is in general greater, the greater the viscosity of the adhesive component itself; however, the viscosity of the mixture is not substantially influenced by the addition of the electrorheological materials. Although, the increase in the viscosity of the mixture when the electric field is applied, is generally not dependent on the viscosity of the adhesive component, the viscosity of the adhesive component and accordingly the mixture should be such that the electrorheological materials can form a fibrated structure within the composition when the electric field is applied. Because it is desirable to obtain a high ratio of induced viscosity to normal viscosity in order to prevent the adhesive composition from running, the adhesive component will be selected having a viscosity greater than about 50 centipoise at 25° C. and less than about 4000 centipoise at 25° C. The preferred viscosity of the fluid adhesive component range between about 50 to about 2500 centipoise at 25° C. and most preferably, about 50 to about 1000 centipoise. It should be understood that the preferred ranges of viscosity apply to the lowest viscosity exhibited by the adhesive component, this viscosity may be an initial viscosity, or it may be the viscosity of the adhesive component after being heated. Further, adhesives having viscosities outside the ranges disclosed can be employed in the present invention, and indeed may be preferred for certain applications.

A common property of the fluid adhesive components usable in the present invention is the nonconductive character of these fluids, by the term "nonconductive or nonconductor" is meant a substance incapable of transmitting electricity, preferably a substance with a dielectric constant between 2 to about 5.5 and an electrical resistivity greater than about $10^{14}$ ohm-cm. Most preferably, the dielectric constant is between about 2 to about 3. The adhesive should be nonconductive so that the electrical properties of the adhesive do not adversely affect the alignment of the electrorheological material when the electric field is applied. If the fluid adhesive is electrically conductive, the applied electric field may have less of an effect because charge will be diverted from the electrorheological materials by the conductive adhesive. Where the conductivity of the fluid adhesive is too great, the adhesive will cause a short across the electrodes creating the electric field.

Examples of adhesives useful in the present invention include common organic and inorganic adhesives that cure under thermal, radiation, chemical, mixed, or other curing conditions. Examples of these types of adhesives include those used in the art of wiring brackets for missile applications. A particularly preferred class of adhesives includes thermosettable adhesives, including EC 2216A/B adhesive available from 3M Company.

The adhesives are generally used in an amount that provides a uniform adhesive layer of adequate strength between the bound surfaces. This amount generally results in a bondline thickness between adjacent surfaces of about 0.003 to about 0.025 inch and preferably a thickness of about 0.003 to about 0.010 inch. When the adhesives are used to provide bond thicknesses within the ranges disclosed, the adhesives are used in the electrorheological adhesive composition in an amount ranging from about 99.5 to about 95 percent, based on the total weight of the electrorheological adhesive. Although the preferred ranges of the adhesive component are discussed above, smaller percentages of the adhesive component may be used so long as the primary adhesive function of the material is maintained.

The present invention is equally applicable to fluid coatings that are applied to slanted or vertical surfaces or surfaces of uneven smoothness where a coating of uniform thickness is desired. The coatings usable in the present invention include the common organic and inorganic coatings that cure under thermal, radiation, chemical, mixed or other curing conditions. These coatings are generally used for providing a layer of protection from physical or chemical degradation of the surface of the substrate. More particularly, the coatings can be used to control the thermal response of a substrate to various radiation inputs or induced heating in a high velocity air stream (e.g., an ablative coating). Examples of these types of coating materials include latexes, plastics, thermosets, thermosettable resins, thermosetting silicones, moisture curing silicones and the like. The coatings are generally applied in an amount that provides a uniform layer of adequate protection, this amount provides a coating thickness ranging from about 0.002 to about 0.5 inch and more preferably about 0.010 to about 0.20 inch. When the coatings are applied in amounts that provide a layer within the disclosed range of thicknesses, the coating components are used in an amount that generally ranges from about 99.5 weight percent to about 95 weight percent, based on the total weight of the electrorheological coating composition. Smaller percentage amounts of the coating component may be used as long as the primary coating function of the material is maintained. For the same reasons discussed hereinabove with regard to the adhesives, the viscosity of the coating component and the mixture of the coating component and the electrorheological material should be within the ranges discussed with regard to the adhesives. Likewise, the coating component should be a nonconductor.

It should be understood that the fluid adhesive and coating components disclosed hereinbefore and, indeed, others which are not listed, but which may be used in accordance herewith, are not identical in their properties. Some are superior to others for certain applications. These examples are given for the purpose of bringing out the wide variations in fluid adhesives and coatings which are available. Certain examples of fluid adhesives and coatings that have been found especially satisfactory are disclosed herein. As one skilled in the art is aware, substitution of ingredients in a composition requires a certain amount of adjusting and, indeed, experimentation in order to obtain the optimum results for a given application. With the information given herein, such a person can readily select those ingredients best suited for the desired use.

The following discussion will use the term "adhesive" interchangeably with the term "coating". The electrorheological adhesive compositions in accordance with the present invention include an electrorheological material in an amount ranging from about 0.5 to about 5 weight percent that increases and maintains the viscosity of the electrorheological adhesive composition when an electric field is applied. The electrorheological materials broadly include hydrophilic particles that form a fibrated structure when an electric field is applied. As in the description of suitable fluid adhesive and coating components, the variety of electrorheological materials that may be employed in the present invention is great. For example, starch, limestone, gypsum, flour, gelatin and carbon are all useful as electrorheological materials. As varied as these materials are, any essentially nonconductive solid having significant ability to adsorb water or other conductive substances, such as alcohol, on its surface, and preferably those with substantial surface area per gram can be employed in accordance with the present invention.

Finely divided silica gel, of the type described hereinafter in detail, is especially suitable for use herein. However, solid particles of the following types having an average diameter of from about $10^{-3}$ to about 5 microns are also useful in the manufacture of the electrorheological adhesives of the present invention: aluminum octoate; aluminum oleate; aluminum stearate; polystyrene carboxylic acid polymer; amorphous silica; barium titanate; colloidal silica; calcium stearate; activated charcoal; colloidal kaolin clay; crystalline D-sorbitol; dimethyl hydantoin resin; flint quartz; lauryl pyridinium chloride; lead oxide; lithium stearate; magnesium silicate; mannitol; microcel-C; micronized mica; molecular sieves nylon powder; onyx quartz; rottenstone; white bentonite; and zinc stearate. Also, certain ferrites, i.e., mixed oxides of various metals prepared as described in the U.S. Pat. Nos. 2,452,529 and 2,452,531 are useful as materials that are responsive to both electrical and magnetic fields.

Other examples of particles useful in the electrorheological adhesive compositions include particles of aluminum dihydrotripolyphosphate, polystyrene, lithium poly (methacrylate), phenol-formaldehyde polymer containing free or neutralized acid groups, and anhydrous polymers that are polar in nature. The anhydrous polymers are similar to the other particles except for the lack of any adsorbed water or waters of crystallization and maybe in the form of an anhydrous electrorheological liquid containing the polar polymers, available from commercial sources such as American Cyanamid Corp., and Lord Corp. Also useful are finely ground synthetic ion exchange resins that may be substituted for the silica gel to give substantially comparable electrorheological adhesive compositions if the proportion of solids is reduced from 100 parts to 60 parts by weight of the total composition.

Especially effective materials for the suspended or dispersed electrorheological phase of the electrorheological compositions are obtained by milling various commercial grades of activated silica gel which have been prepared by the Patrick process and referred to in recent years as xerogels. As is well known, activated silica gels contain surface areas ranging upward from 100 square meters per gram. Hence, even when milled to impalpable powders, each particle is itself highly porous and contains a pore area many times its exterior surface area. The pore surfaces are concave and readily adsorb large amounts of liquids or vapors. It is for this reason that these materials have found use as desiccants, catalysts, etc. Advantage is taken of this porosity to load the particles with conductive substances that modify the electrical characteristics of the particle, such as its conductivity, dielectric constant and surface charge. Although substantial electrorheological properties are exhibited by mixes in which the particles have a size as large as 5 microns, best results have been found when the particle size lies within the range of about $10^{-3}$ to about 1.0 micron in diameter. Present commercial silica gels contain particles larger than this, as well as particles of sharp edged form, and it is found desirable to tumble the material in a mill containing flint pebbles or steel balls for periods of from 5 to 20 hours in order to reduce the size of the particles and round their edges. This may be done with or without the adhesive component. The effect of this preliminary treatment shows up in a final mix having higher breakdown dielectric strength and higher electrorheological viscosity.

In one method, granular activated silica gel, 8 to 16 mesh, is milled in water to 0.1 to 1 micron particle size. The resulting slurry is poured into flat trays and allowed to settle for two days. The supernatant water is then drained off and the settled material is dried to a chalky cake which, with the aid of heat, is reduced to a water content of from 5% to 20% by weight of the anhydrous material. The chalk is readily powdered, stored in sealed containers, and is in condition for incorporation into the fluid adhesive component of the final electrorheological composition. During the milling, various agents may be added which are taken up by the particles and have an effect on the ultimate behavior of the particles. Thus, the particle pH, as indicated by the color of adsorbed dyes, may be fixed at this stage by adding a sufficient amount of acid, base, or buffer solution. When it is desired that the particles be loaded with a conductive substance such as a mixture of alcohol and water, the former may be added during this water grinding operation. Some improvement in the condition of the particles occurs if the aforesaid powder is allowed to age in an open tray or is subjected, four or five times, to alternate dehydration at 250° C. and hydration at room temperature. Apparently, the individual particles become compressed and rounded as the result.

In another method, the particles are properly conditioned by milling the silica gel in the fluid adhesive component in the presence of the surface active agent. An open pebble or ball mill may be used for compositions containing up to about 20% particle volume. It is found advantageous to add small amounts of water during the grinding and finally to subject the mix to heat or low humidity air in order to reduce the water content of the particles to from 5% to 20% by weight of the anhydrous solids during the latter stages of this process. The mix is usually finished after about 24 hours of milling. It may then be concentrated by heating off part of the water, by allowing the suspension to shrink to an equilibrium volume after which the excess water is poured off, or by collecting the suspension in concentrated form by means of a centrifuge. If heat is used to drive off the water, the heat should not be such that the curing of the adhesive component is promoted. This treatment when complete brings the electrical resistivity of the mix within the range of $10^2$ to $10^{10}$ ohm-centimeter, it being in this range that the silica gel type of mix is most efficient. In still another method, the materials for the final electrorheological composition are ground together in their final proportions. In this case, and particularly when the solids content is very high, the mix is initially very thick and paste-like and the milling is done by positive drive rollers or balls which bear against the walls of the container. A volatile liquid may be used for the milling operation followed by distillation to remove the volatile liquid. Whichever method is employed, the milling is continued until particle size is in the preferred range of about $10^{-3}$ to about 1 micron.

While the foregoing treatment has been found desirable for conditioning particles from commercial materials that are dominantly activated silica gel, it has been found that substantially spherical active particles of silica gel can be made without prolonged milling when the precipitation of silica is carried out by the quick method described in U.S. Pat. No. 2,114,123. It is found that the quick precipitate after washing in hot water, partially drying, and dispersing in the dielectric fluid adhesive component can be milled to a $10^{-3}$ to 1 micron particle size in about two hours.

The presence of a minor amount of water is essential to the electrorheological properties of the present compositions except when the electrorheological materials are anhydrous polymers, in which case the water is not a critical element. The water may be added in any one of several stages in the preparation of the composition. Thus, it may be combined with the silica gel or other solids when the same are first added to the fluid adhesive component or it may be introduced at some other stage in the preparation. It is preferred to introduce the water as adsorbed water on the surface of the solids. With certain solids found useful in accordance herewith, particularly silica gel, the desiccant properties of the particles are such that at least a part of the water may be introduced by subjecting the solids, per se, or the mix, during milling to an atmosphere of relatively high relative humidity, e.g., above about 60%. The water may also be added as water of hydration of one of the components of the composition or formed in situ, e.g., in a condensation or esterification reaction. The water should be present in an amount from about 0.5% to about 15% by weight of the total composition and preferably from about 1.5% to about 10%.

It has been found to be particularly advantageous to include along with the minor amount of water a relatively small quantity of a mono- or polyhydroxy compound, e.g., methanol, ethanol, propanol, isopropanol, butanols, pentanols, hexanols, ethylene glycol, diethylene glycol, propylene glycol, glycerine, etc. Amines such as the primary and secondary aliphatic amines, triethylene tetraamine, triethanolamine, 1-hydroxyethyl 2-heptadecenyl-imidazaline have also been found useful. The hydroxy or amino compound may be present in an amount in excess of the water, but the total of water plus hydroxy or amino compound should not exceed about 30% by weight of the total electrorheological composition and preferably should be in the range of from about 10% to about 20% by weight of the total composition.

It appears that the characteristic of the water, water alcohol, water glycol, etc., which have been found useful in accordance herewith as the material adsorbed on the surface of the particles, may be the hydroxyl group present therein. While this has not been established to a certainty, certain additional facts seem to bear out the importance of having hydrophilic group present in materials added for the purpose of providing or enhancing the flow of electrons on the surface of each solid particle. Thus, for example, it is especially desirable to have present in the composition a small amount of an alkali hydroxide, e.g., lithium, potassium or sodium hydroxide. Such alkali hydroxide may be used with advantage in an amount up to about 1% of the total composition. It is, of course, preferably introduced as an aqueous solution, the water of which is included as part of the total water content of the mix in, for example, a 1N solution. Calcium hydroxide has been found useful in some compositions.

A primary function of the optional surface active agent in the present invention is to effect the dispersion of particles throughout the fluid adhesive or coating and to serve as a substantially anhydrous boundary lubricant to permit the free and close admixture of a high percentage of solids. No less important, however, is the function of these agents as electrical insulative skins which are attracted by adsorption or chemical bond to the particle surfaces.

The hydrophilic and also silicophylic polar groups of the surface active agent largely determines the degree of attachment to the particle. Since silica gel is amphoteric in chemical nature, as is also water or alcohol adsorbed in the micropores, the polar group may be acidic, neutral, or basic. For example, this group may be the carboxyl acid group —COOH, or more or less neutral salt, or ester group —COOM or —COOR', where M is a metal and R' is a polyhydric alcohol, or a basic amine group such as NH$_3$OH. If the silica gel matrix contains a metallic hydroxide, a true chemical bond may occur by reaction with a —COOH group of the surface active agent. Similarly, silica gel that has been pretreated to show a marked acid reaction may react chemically with a primary amine or a hydroxy compound to form a chemically held film or skin.

The surface active agents when used in this invention contain a nonpolar group such as a hydrocarbon. It is this nonpolar portion of the molecule, together with potential barriers at the surface, which provide the electrical insulative property of the skin. Being a hydrocarbon and hence organophilic in nature, there is some degree of attraction between the hydrocarbon group and the molecules of the fluid adhesive component, and also between the skins of contacting particles. Hence, there is some residual tendency for the mix to become structuralized. The result is that the nonpotentialized mix frequently shows the properties of a soft jelly. However, the normal gelling forces are so weak that the mix is fluid under slight shear, such as experienced on a slanted or vertical surface, and requires an interval of time when quiescent to reestablish the gelled condition. It is found that electrorheological mixes which are nearest to true liquids in nature are those which have been prepared using a mixture of two or more surface active agents which are themselves either liquids or of low melting point, such as various oleates. Conversely, surface active agents of high melting point, such as various stearates, produce mixes of greater body or grease-like character.

So-called anionic types of surface active agents which have been found suitable in preparing electrorheological adhesive compositions include the fatty acids of 8 to 26 carbon atoms, the naphthenic acids averaging about 18 carbon atoms, and the resinic acids (abietic, primaric, etc.) of 20 carbon atoms. Also effective are the metallic or hydroxy metal salts of these acids of the general formula $(RCOO)_xM$ where M is one of the following: lithium, sodium, potassium, ammonium, Fe(OH)$_2$, or Al(OH)$_2$, when x equals 1; magnesium, calcium, strontium, barium, zinc, cadmium, tin, lead, manganese, iron, cobalt nickel, FeOH, or AlOH, when x equals 2; and iron or aluminum, when x equals 3.

The foregoing salts may be made in known matter, as by double decomposition of the acetate in the carboxylic acid when sodium hydroxide solution is added, or by heating a mixture of the carbonate or the freshly prepared hydroxide of the metal with the carboxylic acid. For the fatty acid, those sold under the name NEO-FATS TM fatty acids have been found suitable; for the naphthenic acids a grade known as ORONITE TM N naphthenic acids is satisfactory. Pine resin is used for preparing the resinates. A number of salts mentioned are sold as paint and varnish driers and can be obtained on the market from commercial sources.

Of the surface active agents of cationic type may be mentioned the primary amines of general formula RNH$_2$ which form salts with acids absorbed by the silica gel particles. A mixture of primary amines containing 14, 16 and 18 carbon atoms, sold under the designation AM-118.5C, will react with an acid to form a specific example of this class. Another example is lauryl pyridinium chloride.

The nonanionic type of surface active agents include the cresols, amino silane sold under the designation of SYLON TM RD-602 amino silanes, and the partial or complete esters of polyhydric alcohols. The latter include fatty acid esters of ethylene glycol, glycerine, mannitol and sorbitol. Specific examples are sorbitan sesquioleate and mono-oleate, sold under the names ARLACEL TM C and SPAN TM 80; a sorbitan monolaurate (SPAN ™ 20); and a polyoxyalkalene derivative or sorbitan trioleate (TWEEN ™ 85).

The strongest and least conductive electrorheological adhesive compositions are provided by employing a mixture of two or more of the foregoing agents. This is probably in part due to the composite nature of the particle surface, i.e., silica and water for reasons explained hereinabove. Another rule for choosing the most suitable agent is that strongly acidic or basic particles, as tested by indicator dyes, call for strongly basic or acidic polar groups, respectively.

The required amount of surface active agent increases with the porosity of the particle. For round nonporous particles of 0.5 micron mean diameter, the computed volume of an 18 carbon chain monolayer, such as an oleate for example, is 3 percent of the particle volume; seldom more than twice this amount is required for nonporous particle materials. However, for porous silica gel powders, ranging from $10^{-3}$ to 1.0 micron mean particle size and 5 percent to 20 percent water by weight of silica, the necessary amount of surface active agent range from about 25 percent to 50 percent by volume of the particles, or from 15 percent to 30 percent by weight of silica. It is evident that the surface active agents penetrate the particle. The added weight of the surface active agents adsorbed onto the silica gel particles ranges from 20 percent for a low porosity grade to 40 percent for a high porosity grade. In general, it appears that a surface active agent should be present in an amount of from about 5 to 15 percent of the total electrorheological adhesive composition. An appreciable excess of the surface active agent beyond these limits will result in a composition having low electrorheological properties. On the other hand, a deficiency will result in a composition in which the particles lack complete boundary lubrication and tend to form agglomerates or have a lock-in habit when potentialized.

Examples of surface active agents which have been found useful in accordance herewith are: tetrasodium N-(1,2-dicarboxylic)-N-octadecylsulfosuccinate; sodium di-octyl sulfosuccinate; sodium bis(tridecyl)sulfosuccinate; 4,4-dimethyl-2-heptadecenyl-2-oxaline; 4-ethyl, 4-hydroxymethyl decenyl-2-oxacoline; 4-methyl 4-hydroxymethyl decenyl-2-oxacoline; 4,4-bishydroxymethyl-2-heptadecenyl-2-oxazoline; N-hydroxyethyl (2-heptadecenyl glyoxalidine); sorbitan sesquioleate; sorbitan partial fatty esters; di-(2-ethylhexyl amine); polyoxyethylene ether alcohol; polyoxyethylene alkyl aryl ether; polyoxyethylene esters of mixed fatty and resin acids; polyoxyethylene ether alcohol; sorbitan monolaurate; sorbitan monopalmitate; sorbitan monostearate; sorbitan tristearate; sorbitan mono-oleate; sorbitan trioleate; nonyl phenol reacted with 4, 9 or 12 moles ethylene oxide; sodium tetradactyl sulfate; sodium heptadecenyl sulfate; sodium 2-ethyl hexyl sulfate; sodium di-(2-ethyl hexyl) phosphate; polyalkylene glycol ether; alkylphenyl ether of polyethylene glycol; trimethylnonylether of polyethylene glycol; alkyl phenyl ethers of polyethylene glycol; polyoxyethylene sorbitan monolaurate palmitate; polyoxyethylene sorbitan monolaurate stearate; polyoxyethylene sorbitan monolaurate tristearate; and polyoxyethylene sorbitan monolaurate trioleate.

While various types of surface active agents have been described in some detail, these should not be considered as exhaustive of those which can be used to achieve the dispersive and insulative effect. It will be understood that the surfactants contribute to uniformity of the composition and, indeed, to viscosity reduction of the overall mix prior to application of the electric field.

It may sometimes be found desirable to add a material capable of stabilizing the viscosity of the electrorheological adhesive composition when the same is not under the influence of the electrical field. In general, materials which have found utility as viscosity index improving agents in lubricating oils have also been useful for this purpose in electrorheological compositions of the present type. Thus, methacrylic polymers sold by Rohm & Haas under the trade names ACRYLOID ™, e.g., HF-820, HF-825 and HF-829, have been found useful. Also polyisobutylenes such as Esso Corporations PARATONE ™ have also demonstrated this property. The diesters of dicarboxylic acids containing from 6 to about 9 carbon atoms, e.g., diisooctyl adipate, di-secamyl sebacate, etc., have been found to render the fluids less viscous. The added viscosity stabilizing materials are preferably added in amounts of from about 0.5 percent to about 2 percent of the total composition.

It is important that the components of the adhesive compositions prepared in accordance herewith be thoroughly admixed, so as to afford a homogenous, substantially stable fluid. This has been found at times to be a difficult task, particularly with the high levels of solids content and small particles. Ball mills, roll mills, colloid mills, as well as various types of dispersion mixers have, however, all been used with success. It has been most satisfactory to employ a dispersion mixer. With such mixers liquefication and homogeneity appear to be most readily attained in the shortest period of time. Combinations of mixing equipment have also been found satisfactory. Thus, Hobart planetary mixers or ball mills have been used while the mix is in its most viscous stage with the mix being later transferred to a colloid mill for work in the more fluid stage.

The temperature at which the adhesive component and the electrorheological materials are mixed is primarily dependent upon the particular adhesive employed. Generally, the temperature should be high enough to decrease the viscosity of the adhesive to enable the electrorheological material to be easily mixed into the adhesive. However, where the adhesive is thermosettable, the temperature should not be so high that it promotes the premature curing and hardening of the adhesive. Generally, the mixing temperature will range from about 15° to about 38° C., preferably, from about 18° to about 35° C. and, most preferably, from about 20° to about 25° C.

The mixture of the adhesive component and the electrorheological material is generally applied to slanted or vertical surfaces that are to be bonded or coated. The method by which the electrorheological composition is applied to the surfaces is not critical to the practice of the present invention. Conventional means may be employed such as brushing, spraying, dipping, and the like. The application of the adhesive composition to the surface should result in a relatively uniform layer of the composition, thus reducing the potential for discontinuities in the adhesive layer or unevenness in the coating layer. Depending on the initial viscosity of the adhesive composition under the application conditions, it is possible that, immediately after application, the composition will begin to run. However, other compositions with higher initial viscosities will tend to remain in place for a period of time after application and will begin to run when heat is applied. The degree to which the adhesive composition runs initially or after application of heat, will determine the period of time that is allowable between the application and/or heating of the adhesive composition and the application of the electric field. When the adhesive composition tends to run immediately, the electric field will be applied as soon as possible in order to increase the viscosity and prevent the running. If the adhesive composition does not run immediately after application, it will not be necessary to apply the electric field to the composition until heat is applied and the viscosity of the composition decreases sufficiently to allow the composition to run. In order to provide a continuous adhesive layer or even coating layer, the electric field should be applied to the adhesive composition until it has set and is no longer capable of running.

The electric field that is applied to the electrorheological adhesive composition cooperates with the electrorheological material to form a fibrated structure that serves to increase the viscosity of the adhesive composition. The electric field can be generated by conventional sources such as a Hipotronics 300 Series Hipot. The strength of the electric field should be such that the viscosity of the adhesive composition is increased enough to prevent the composition from running both after application as well as when heat is applied. Generally, the electric field will range from about 500 volts/mm to about 3000 volts/mm, more preferably from about 2000 volts/mm to about 2500 volts/mm, and most preferably from about 2200 volts/mm to about 2500 volts/mm. The particular ranges of voltages applied will depend upon the desired increase in viscosity of the adhesive composition, the resistance to electric current of the components, as well as the amounts of the electrorheological material and the sensitivity of the material to the electric field.

In accordance with the present invention, the viscosity of the electrorheological adhesive composition is increased a sufficient amount to prevent the composition from running when applied to a slanted or vertical surface or from collecting in the lower portions of uneven surfaces. Generally, when the adhesive composition runs immediately upon application or when subjected to heat, the viscosity may be increased by an amount ranging from about 500 percent to about 10,000 percent of the original viscosity of the adhesive composition. Preferably, the viscosity may be increased by an amount which results in a composition having a viscosity in excess of about 12,000 centipoise at 25° C.

The compositions and method of the present invention, provide electrorheological adhesives and coating compositions that can be applied and cured on slanted or vertical surfaces without the bonds or coatings suffering from discontinuous adhesive layers or uneven coating layers resulting from the running of the compositions during application or heating. The present invention is further illustrated by the following examples which are presented to illustrate the present invention and to assist one in ordinary skill in making and using the same. The examples are not intended in any way to either limit the scope of the disclosure or the protection afforded by the grant of Letters Patent hereon.

EXAMPLES

A fluid adhesive is provided containing 100 grams of a fluid adhesive. The fluid adhesive composition has an initial viscosity of 500 cp at 25° C. and a specific gravity of 1.10.

1.64 wt. %, based on the weight of the fluid adhesive, of submicron fused silica particles, with a specific gravity of 2.2 available from Cabot Corporation, Tuscola, IL under the trade name CAB—O—SIL TM, is added to the fluid adhesive with stirring to disperse the silica particles. Prior to being added to the fluid adhesive, the silica particles are exposed to an environment of 100% relative humidity at 20° C. for about 24 hours.

The fluid adhesive composition is placed between two vertical metal plates. The first plate is a positive electrode and the second plate is a negative electrode. The electrodes are spaced 1 mm apart and cooperate to provide an electric field of about 2.5 kV/mm. Immediately after being placed between the vertical plates, the fluid adhesive containing the silica particles begins to run down between the plates. The voltage source is applied to the respective plates and almost immediately the fluid adhesive achieves a nonrunning state due to an increase in the viscosity of the fluid adhesive.

The nonflowing adhesive is subjected to thermal curing conditions that result in an adhesive layer of uniform thickness between the electrodes.

Particular embodiments of the present invention described above are to be considered in all respects as illustrative and not restrictive. The scope of Letters Patent granted hereon is to be limited only by the definition set forth in the appended claims and equivalents thereof.

The embodiments of the invention in which an exclusive property or privilege is claimed are defined as follows:

1. A method for bonding a first surface to a second surface by applying a curable adhesive composition containing a fluid adhesive component to at least one surface wherein the improvement comprises:
    (a) using an adhesive composition containing an electrorheological material, said electroheological material present in an amount serving to increase the viscosity of the adhesive composition to a gel state when an electric field is applied to the adhesive composition;
    (b) applying the adhesive composition to at least one surface;
    (c) positioning the first surface immediately adjacent to the second surface such that said adhesive composition contacts both surfaces;
    (d) applying the electric field to the adhesive composition, said electric field cooperating with the electrorheological material to increase the viscosity of the adhesive composition to a gel state; and
    (e) curing the fluid adhesive component.

2. The method of claim 1, wherein the viscosity of the adhesive composition in step (d) with the electric field applied is such that the adhesive composition is in a nonflowable, gel-state.

3. The method of claim 1, wherein the electrorheological material is selected from the group consisting of finely divided silica, silica gel, glass spheres and silica spheres.

4. The method of claim 1, wherein the electrorheological material is a polar material.

5. The method of claim 1, wherein the fluid adhesive component is a nonconductor.

6. The method of claim 1, wherein the fluid adhesive component is selected from the group consisting of epoxy, polyurethane and silicone adhesives.

7. The method of claim 1, wherein the potential of the electric field ranges from about 2000 to about 2500 volts/mm.

8. The method of claim 2, wherein the viscosity of the adhesive composition in step (d) with the electric field applied is at least about 12,000 centipoise.

9. The method of claim 1, wherein the viscosity increase caused by application of the electric field is from a first viscosity low enough to permit application of the adhesive composition in fluid form, to a second viscosity high enough to prevent the adhesive composition from flowing under its own weight when applied to a nonhorizontal surface.

10. The method of claim 1, wherein said electrorheological material comprises about 0.5 to about 5.0 weight percent based on the total weight of the adhesive composition and the electric field is in the range of about 2000 to about 2500 volts/mm.

11. The method of claim 1, wherein the adhesive composition comprises:
a fluid adhesive component; and
an electrorheological material present in an amount effective to increase the viscosity of the adhesive composition to a gel state when an electric field is applied to the adhesive composition.

12. The method of claim 1, wherein the fluid adhesive component is selected from the group consisting of epoxy, polyurethane, and silicone adhesives.

13. The method of claim 1, wherein the electrorheological material is selected from the group consisting of finely divided silica, silica gel, glass spheres, and silica spheres.

14. A method for bonding two surfaces together comprising the steps of:

(a) applying a fluid adhesive in a bondline between the two surfaces to be bonded, the adhesive including an effective amount of an electrorheological fluid sufficient for gelling the adhesive when an electric field is applied to the adhesive;

(b) applying the electric field to the adhesive to gel the adhesive; and, (c) curing the adhesive while continuing to apply the electric field.

15. The method of claim 14 wherein, in the absence of an electric field, the adhesive has a viscosity in the range of 50-4000 centipoise at 25° C.

16. The method of claim 15, wherein the adhesive has a dielectric constant in the range of about 2.0-5.5 and an electrical resistivity of at least about $10^{-14}$ ohm-cm.

17. The method of claim 14, wherein the step of curing involves heating the adhesive to an elevated temperature.

18. The method of claim 17, wherein the adhesive is thermosettable.

19. The method of claim 14, wherein the electrorheological fluid comprises about 0.5-5.0 wt. % of the adhesive.

20. The method of claim 14, wherein the electrorheological fluid is an anhydrous polymer and the adhesive is an organic resin.

21. The method of claim 14, wherein the adhesive also includes a hydroxy or an amino compound, water, and an organic resin.

22. The method of claim 14, wherein the electric field is in the range of about 2000-2500 volts/mm.

23. The method of claim 14, wherein the gelled adhesive of step (b) has a viscosity of at least about 12,000 centipoise.

* * * * *